Patented Jan. 10, 1939

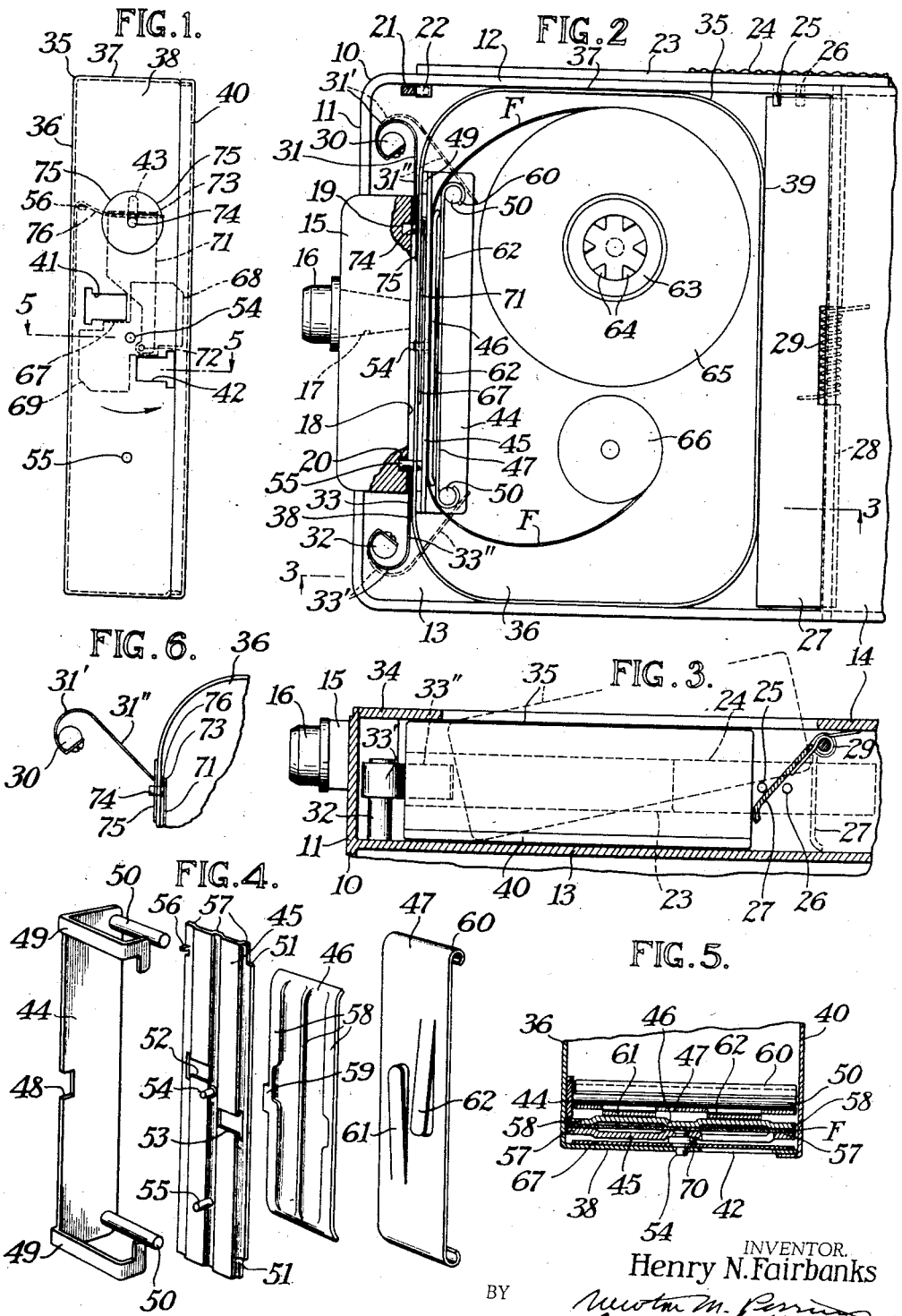

2,143,769

UNITED STATES PATENT OFFICE 2,143,769

CLOSURE MEANS FOR A FILM MAGAZINE AND ARRANGEMENT FOR OPERATING THE SAME

Henry N. Fairbanks, Rochester, N. Y., assignor, by mesne assignments, to Eastman Kodak Company, Jersey City, N. J., a corporation of New Jersey Application May 16, 1936, Serial No. 80,163

11 Claims. (Cl. 88—17)

The present invention relates to a motion picture apparatus of the magazine type and more particularly to a closure means for a film magazine and an arrangement within the motion picture apparatus for operating said closure means.

Light-sealing shutters for film magazines are well known but are generally slidable with respect to the magazine and operated individually or automatically upon insertion of the film magazine into the apparatus. It is also well recognized that locating projections may be provided on the exterior of the film magazine for guiding the film magazine into proper position with respect to the apparatus. The primary object of the present invention is the provision in a film magazine of a locating stud for engaging a part on the apparatus to locate properly the film magazine and the provision of a light-sealing shutter which is pivotally mounted upon said locating stud.

Another object of the invention is the provision in the apparatus of a plurality of springs which extend into the magazine chamber and which engage a shutter operating pin on the magazine, said springs being comparatively rigid in a longitudinal direction to compel operation of the magazine shutter and including circular resilient portions to compensate for any over-travel between the springs and operating pin.

A further object is the provision of a presser member at the rear of the magazine chamber, pivoted about an axis parallel to the front wall of the magazine chamber and spring pressed to engage the rear of the film magazine.

Still another object of the invention is the provision of a latching bar for fastening a cover of the apparatus in closed position and for operating the aforementioned presser member to repel it and permit removal of the magazine.

Other and further objects of the invention will be suggested to those skilled in the art by the following apparatus.

To these and other ends the invention consists of certain parts and combinations of parts, all of which will be hereinafter described, the novel features being pointed out in the appended claims.

Reference is hereby made to the accompanying drawing wherein similar reference characters designate similar elements and wherein:

Fig. 1 is a front elevation of a film magazine equipped with a pivoted shutter according to the invention.

Fig. 2 is a side elevation of a motion picture apparatus containing a film magazine and provided with spring members for operating the shutter on the film magazine and with a presser member for maintaining the film magazine in proper position.

Fig. 3 is a transverse cross-section through the magazine chamber of the apparatus and taken on the line 3—3 of Fig. 2.

Fig. 4 is an exploded perspective view of the parts constituting the film gate in the magazine.

Fig. 5 is a fragmentary cross-section through the film gate of the magazine taken on the line 5—5 of Fig. 1.

Fig. 6 is a fragmentary elevation showing the shutter operating pin on the film magazine and a leaf spring on the apparatus prior to movement of the film magazine into proper position.

For purposes of illustration only the invention is to be described with respect to a motion picture camera of the magazine type but it is to be understood that the invention may be used on other apparatus of the magazine type.

Said motion picture camera comprises a casing 10 having a front lateral wall 11, an upper lateral wall 12, a mechanism plate 13 and a rear cover plate 14. An abutment or objective block 15 is mounted in the front lateral wall 11, carries an objective 16, and is provided with an exposure opening 17 extending from objective 16 to the magazine chamber within said casing 10. The rear wall 18 of objective block 15 is preferably flat and straight and forms the front boundary of said magazine chamber. Said objective block 15 is also provided with a pair of holes 19 and 20 for a purpose to be later described.

A latching means is arranged to fasten a cover, not shown, to the casing 10. A hook 21 is provided on the camera cover and is engaged by a fin 22 upon a latching bar 23 which is slidably mounted upon the upper lateral wall 12 of the camera casing 10. A finger piece 24 is provided on said latching bar 23 to facilitate movement thereof and a pair of projections 25 and 26 extend from the latching bar 23 into the interior of the casing.

A presser member 27 is pivotally mounted upon a hinge pin 28 just below the edge of rear cover plate 14 and is urged in a clockwise direction by a coil spring 29 which encircles hinge pin 28 and has one end bearing upon presser member 27, while the other end bears upon the lower surface of rear cover plate 14. The projections 25 and 26 on the latching bar 23 straddle the upper edge of presser member 27, see Figs. 2 and 3, so that upon movement of latching bar 23 to unlocking position the presser member 27 is rotated in a counterclockwise direction by reason of the engagement of projection 25 with presser member 27 and finally assumes a position, such as indicated by dotted lines in Fig. 3.

A plurality of spring members are provided adjacent the objective block 15 and include a post 30 to which a leaf spring 31 is attached and also a post 32 to which a leaf spring 33 is attached. The leaf spring 31 has a circular portion 31' and a straight portion 31'', while leaf spring 33 has a circular portion 33' and a straight portion 33''. Said leaf springs 31 and 33 normally assume the dotted line positions shown in Figs. 2 and 3 and extend into the magazine chamber. A front cover plate 34 encloses the front portion of the camera casing 10, see Fig. 3, and partially overlaps the forward portion of the magazine chamber. For the sake of clarity, said front cover plate is not shown in Fig. 2.

The film magazine comprises a casing 35 having a side wall 36, and a lateral wall 37 including a front lateral wall 38 and a rear lateral wall 39 which is parallel to said front lateral wall 38. A magazine cover 40 engages the edges of lateral wall 37 to enclose the magazine casing 35. The front lateral wall 38 of magazine casing 35 is provided with an exposure aperture 41, an exposure aperture 42 and an elongated slot 43.

The film gate is within the film magazine and comprises a frame member 44, a gate plate 45, a pressure pad 46 and a spring member 47. The frame member 44 is provided with a notch 48 and carries at opposite ends arms 49 and posts 50.

The gate plate 45 is provided with notches 51 with an exposure aperture 52 and an exposure aperture 53 which register respectively with exposure apertures 41 and 42 in the front lateral wall 38 of magazine casing 35 when said gate plate 45 is mounted upon said frame member 44 with the arms 49 thereof engaging the notches 51 in gate plate 45. A focusing pin 54 is fixed to the center of gate plate 45 and framing pin 55 is fixed to gate plate 45 adjacent one end thereof. A lug 56 is bent out of one edge of gate plate 45. A plurality of longitudinal film engaging portions 57 extend along gate plate 45.

The pressure pad 46 is also provided with a plurality of longitudinal film engaging portions 58 and has a tongue 59 for fitting into the notch 48 of frame member 44 to prevent longitudinal movement of said pressure pad 46 with the film. The spring member 47 has curved ends 60 for fitting over the posts 50 of frame member 44, and includes a pair of tabs 61 and 62 for resiliently pressing upon the rear of presser pad 46 and with the ends opposite the exposure apertures 52 and 53 in gate plate 45.

The supply film core 63 has engaging teeth 64, is rotatably mounted between the side wall 36 and cover 40 of the magazine casing 35, and carries the supply film roll 65. The take-up film core 66 is also rotatably mounted in a known manner between side wall 36 and cover 40 of the film magazine. The film F extends from the supply film roll 65 through the film gate between gate plate 45 and pressure pad 46, and to the takeup film core 66. The film gate construction just described is particularly well suited for the exposure of laterally adjacent longitudinally extending sequences of pictures on the same film.

The film engaging portions 57 and 58 engage the margins and center line of the film F, while the tabs 61 and 62 of spring member 47 bear on each side of the pressure pad 46 and produce an individual pressure on the film F over each exposure apertures 52 and 53 in gate plate 45.

A closure means is provided on the film magazine between the front lateral wall 38 and the gate plate 45. Such a closure means comprises a shutter 67 having a blade 68 for covering exposure apertures 41 and 52 and having a blade 69 for covering exposure apertures 42 and 53. A bushing 70, see Fig. 5, is inserted at the center of shutter 67 and is mounted upon the focusing pin 54 which extends from gate plate 45 and through the front lateral wall 38 of magazine casing 35 to the exterior of the film magazine. The front surface of said focusing pin 54 is spaced a predetermined distance from the surfaces of film engaging portions 57 so that abutment of pin 54 against objective block 15 will accurately locate the film held against film engaging portions 57 of the gate plate 45 in the focal plane of objective 16. The focusing pin 54 now accomplishes a dual purpose in that, in addition to insuring accurate location of the film by abutment with the objective block 15, it also constitutes a bearing for the rotatable shutter 67.

The operating member for said shutter 67 includes a link 71 which is eccentrically pivoted at one end by a pin 72 to said shutter 67. The other end of link 71 is provided with a flange 73 and carries a pin 74 extending through elongated slot 43 in the front lateral wall 38 of magazine casing 35. A guard disc 75 is fastened to pin 74 and covers said elongated slot 43. A wire spring 76, see Fig. 1, extends along the side wall 36 of casing 35, is bent around the lug 56 and engages the flange 73 on link 71 normally to urge the operating member and shutter 67 to closed position.

The shutter 67 is illustrated in Fig. 1 in abnormal or open position and spring 76 tends to swing shutter 67 in a counterclockwise direction so that blades 68 and 69 will cover exposure apertures 41 and 42, respectively. It will be noted that the guard disc 75 covers the elongated slot 43 in either position of the operating member for the shutter 67.

The operation of the various spring elements upon insertion and removal of the film magazine will now be described. With the camera casing open and latch bar 23 in unlocking position, the presser member 27 assumes the position shown by dotted lines in Fig. 3. Before insertion of the film magazine the leaf springs 31 and 33 assume the positions shown by dotted lines in Figs. 2 and 3 and by the full lines in Fig. 6. The shutter 67 on the film magazine is held in closed position by the wire spring 76. The film magazine is now inserted as illustrated by the doted lines in Fig. 3 and the outer ends of leaf springs 31 and 33 are adjacent the front lateral wall 38 of casing 35, the upper leaf spring 31 having its outer end bearing against the guard disc 75 of the shutter operating member, see Fig. 6.

The camera cover may now be closed and the latching bar 23 moved to locking position in which position the fin 22 on the latching bar engages the hook 21 on the cover and the presser member 27 is free to move under the influence of coil spring 29. In case some obstruction prevents presser member 27 from being operated by coil spring 29, the projection 26 will swing the presser member 27 about hinge pin 28. Said presser member 27 now swings in a clockwise direction and bears against the rear lateral wall 39 of magazine casing 35.

Since presser member 27 is pivoted about an axis parallel to the rear wall 18 of objective block 15, the film magazine will be moved forwardly with its front wall 38 parallel to said rear wall 18 of objective block 15. Coil spring 29 is stronger than the combined effect of leaf springs 31 and 33 upon the film magazine. Therefore, upon release of the spring member 27, the film magazine will be moved forwardly with coil spring 29 predominating over leaf springs 31 and 33.

As the film magazine is moved forwardly the straight portion 31'' of leaf spring 31 abuts against pin 74 of the operating member for shutter 67. This straight portion 31'' of leaf spring 31 is quite rigid in a lengthwise direction and will present sufficient rigidity in its turning movement to cause pin 74 to be moved downwardly as the film magazine approaches the objective block 15. After the shutter 67 is moved to full open position, any additional movement of the film magazine to bring focusing pin 54 into abutment with the rear wall 18 of objective block 15 will cause expanding of the circular portion 31' of leaf spring 31. The provision of such a circular portion 31' is essential because the straight portion 31'' is so rigid against the thrust exerted by the operating pin 74 that one of the parts might be damaged during any over-travel of the magazine necesary to bring focusing pin 74 against objective block 15. At the same time lower spring 33 will bear against the front lateral wall 38 of casing 35 and its end will finally abut against the framing pin 55 and again the circular portion 33' will compensate for any excess end thrust upon the straight portion 33''.

The framing pin 55 extends through the front lateral wall 38 of casing 35 and is integral with the gate plate 45. Said framing pin 55 fits into the hole 28 in objective block 15 to frame, under the conditions shown in Fig. 2, the exposure apertures 41 and 52 with respect to the exposure opening 17 in objective block 15.

After the initial run of film has been completed, the latching bar 23 is moved to unlocking position, the projection 25 bears against presser member 27 to move said presser member 27 into the vertical position shown by dotted lines in Fig. 3. As the presser member 27 is swung in a counterclockwise direction, the leaf springs 31 and 33 bearing upon the front lateral wall 38 of the film magazine will cause the rear lateral wall 39 thereof to be maintained against presser member 27. At the same time the operating pin 74 for shutter 67 will be released so that wire spring 76 can move said shutter 67 to closed position or over the exposure apertures 41 and 42. This rearward movement under the influence of leaf springs 31 and 33 also removes the front edge of the film magazine from under the front cover plate 34 so that the film magazine can be readily taken from the magazine chamber of the camera.

The film magazine is now inverted and re-inserted into the magazine chamber. The latching bar 23 is moved to locking position and the presser member 27 again moves the film magazine forwardly against leaf springs 31 and 33 but in inverted position of the film magazine. The leaf spring 33 now operates the pin 74 to open the shutter and the framing pin 55 now enters the upper hold 19 for proper framing of the film magazine. The focusing pin 54 also abuts against the objective block 15.

In order that the leaf springs 31 and 33 will exert the same influence upon the film magazine in its final position, the framing pin 55 is located on the magazine so as to be symmetrical with respect to the operating pin 74 when said pin is in a position corresponding to the open position of shutter 67.

It is obvious that many variations of my invention are possible. Therefore, the present disclosure is to be construed in an illustrative sense, the scope of the invention being defined in the claims which follow.

Having now particularly described my invention what I desire to secure by Letters Patent of the United States and what I claim is:

1. In a motion picture apparatus provided with a magazine chamber, the combination with a film magazine comprising a casing having a lateral wall provided with an exposure aperture, of an abutment against which said film magazine is held for proper location thereof, a cover for enclosing said magazine chamber, a spring pressed member for holding said film magazine against said abutment, and a locking member for fastening said cover in closed position and including a projection for retracting said spring member when said locking member is moved to unlocked position.

2. In a motion picture apparatus provided with a magazine chamber, the combination with a film magazine comprising a casing having parallel front and rear lateral walls, of an abutment in said apparatus and having a straight wall at the front of said magazine chamber, a presser member at the rear of said magazine chamber and pivoted about an axis parallel to the straight wall of said abutment, and a spring for swinging said presser member toward said abutment and against the rear wall of said magazine to hold the front wall thereof against the straight wall of said abutment.

3. In a motion picture apparatus provided with a magazine chamber, the combination with a film magazine comprising a casing having parallel front and rear lateral walls, of an abutment in said apparatus and having a straight wall at the front of said magazine chamber, a presser member at the rear of said magazine chamber and pivoted about an axis parallel to the straight wall of said abutment, a spring for swinging said presser member toward said abutment and against the rear wall of said magazine to hold the front wall thereof against the straight wall of said abutment, a cover for enclosing said magazine chamber, and a latching bar for fastening said cover in closed position and including a projection for engaging and swinging said presser member against the action of said spring upon movement of said latching bar to unlocking position.

4. In a motion picture apparatus provided with a magazine chamber, the combination with a film magazine comprising a casing having a lateral wall provided with an exposure aperture, a shutter for closing said aperture, a pin connected to said shutter and extending from said magazine, and a resilient means for holding said shutter in closed position, of an abutment in said apparatus against which said film magazine is held for proper location thereof, a spring pressed member extending into said magazine chamber for moving and holding said film magazine against said abutment, and a plurality of springs also extending into said magazine chamber for abutting and operating the pin on said shutter, movement of said film magazine by the action of said spring pressed member operating said plurality of springs which predominate over said resilient means to open said shutter.

5. In a motion picture apparatus provided with a magazine chamber, the combination with a film magazine comprising a casing having a lateral wall provided with an exposure aperture, a shutter for closing said aperture, an operating member for said shutter and including a pin extending through said lateral wall, and a locating stud on said lateral wall and located on the magazine symmetrical to said pin only when said shutter is in open position, of a pair of spring members in said apparatus, each including a circular portion with one end fixed to said apparatus, and each including a straight portion which is comparatively rigid in a longitudinal direction and which extends into said magazine chamber, each of said straight portions being adapted symmetrically to engage said pin and said stud upon forward movement of said magazine within said chamber.

6. In a motion picture apparatus provided with a magazine chamber, the combination with a film magazine comprising a casing provided with an exposure aperture, a shutter for closing said aperture, and an operating member for said shutter and including a pin extending from said casing, a spring member having a circular portion with one end affixed to said apparatus and including a straight portion for engaging the pin on said magazine, which portion is comparatively rigid in a longitudinal direction and which is adapted by movement of said magazine toward said spring member to move said pin and open said shutter, said circular portion compensating for any additional thrust on said straight portion caused by continued movement of said magazine after the shutter is fully open.

7. The combination with a motion picture apparatus including a magazine chamber and having a fixed block provided with an exposure opening and a pair of framing holes, of a film magazine adapted to be inverted with respect to said magazine chamber and comprising a casing adapted to contain a film strip and having a lateral wall, a film gate within said casing and including a gate plate against which said film strip is held, said lateral wall and said gate plate each being provided with a pair of displaced exposure apertures, and a framing stud fixed to said gate plate, extending through said lateral wall and for fitting into one of said framing holes in said fixed block to frame one set of exposure apertures in said gate plate and said lateral wall with respect to said exposure opening and for fitting into the other of said framing holes in said fixed block to frame the other set of exposure apertures with respect to said exposure opening upon inversion of said film magazine.

8. In a film magazine, the combination with a casing adapted to contain a film strip and having a lateral wall, and a film gate within said casing and including a gate plate against which the film strip is maintained, said lateral wall and said gate plate each being provided with an exposure aperture, of a locating stud fixed to said gate plate and extending through said lateral wall, and a closure means rotatably mounted between said lateral wall and said gate plate upon said stud and for covering said exposure apertures in said lateral wall and said gate plate.

9. In a film magazine, the combination with a casing adapted to contain a film strip and having a lateral wall, and a film gate within said casing and including a gate plate against which the film strip is maintained, said lateral wall and said gate plate each being provided with an exposure aperture, of a locating stud fixed to said gate plate and extending through said lateral wall, and a closure means comprising a shutter rotatably mounted between said lateral wall and said gate plate upon said stud and for covering said exposure aperture in said wall and gate plate, an operating member eccentrically pivoted at one end to said shutter and including a pin extending through a slot in the lateral wall of said casing, and a spring member bearing on said operating member normally to move said pin within said slot and to move said shutter into position to cover said exposure aperture.

10. In a film magazine, the combination with a casing adapted to contain a film strip and having a lateral wall provided with a pair of displaced exposure apertures and a slot, and a film gate within said casing including a gate plate which is provided with a pair of displaced exposure apertures and against which the film strip is held, of a locating stud fixed to said gate plate and extending through said lateral wall to the exterior of said casing, and a closure means comprising a shutter rotatably mounted between said lateral wall and said gate plate upon said stud and having a pair of blades for covering both sets of said exposure apertures, an operating member eccentrically pivoted at one end to said shutter and including a pin slidable within said slot in the casing, a spring member engaging said operating member and urging said shutter into position to cover both sets of exposure apertures, and a guard plate on said pin and overlapping the margins of said slot in closed and open positions of said shutter.

11. In a film magazine of the invertable type, the combination with a casing adapted to contain a film strip and having a lateral wall provided with a pair of laterally displaced exposure apertures, a gate plate within said casing, having a plurality of film engaging portions, and provided with a pair of laterally displaced exposure apertures in registration with said apertures in the lateral wall, and a pressure pad within said casing and having a plurality of film engaging portions, of supporting members within said casing and spaced from said gate plate, and a spring member mounted upon said support member and having laterally displaced tabs with ends opposite each exposure aperture in said gate plate and each for bearing on laterally displaced portions of said pressure pad resiliently to hold the same in place.

HENRY N. FAIRBANKS.